(12) United States Patent
Andersson et al.

(10) Patent No.: US 11,872,878 B2
(45) Date of Patent: Jan. 16, 2024

(54) TRUCK WITH REAR WALLS FOR HYDROGEN STORAGE

(71) Applicant: Volvo Truck Corporation, Gothenburg (SE)

(72) Inventors: Arne Andersson, Mölnlycke (SE); Staffan Lundgren, Hindås (SE)

(73) Assignee: Volvo Truck Corporation, Gothenburg (SE)

( * ) Notice: Subject to any disclaimer, the term of this patent is extended or adjusted under 35 U.S.C. 154(b) by 92 days.

(21) Appl. No.: 17/771,855

(22) PCT Filed: Nov. 1, 2019

(86) PCT No.: PCT/EP2019/079988
§ 371 (c)(1),
(2) Date: Apr. 26, 2022

(87) PCT Pub. No.: WO2021/083533
PCT Pub. Date: May 6, 2021

(65) Prior Publication Data
US 2022/0371434 A1    Nov. 24, 2022

(51) Int. Cl.
*B60K 15/07* (2006.01)
*B60L 50/71* (2019.01)
(Continued)

(52) U.S. Cl.
CPC .............. *B60K 15/07* (2013.01); *B60L 50/71* (2019.02); *B62D 35/001* (2013.01);
(Continued)

(58) Field of Classification Search
CPC .......... B60K 15/07; B60K 2015/03118; B60K 2015/03315; B60K 2015/0639;
(Continued)

(56) References Cited

U.S. PATENT DOCUMENTS

| | | | |
|---|---|---|---|
| 10,730,460 B2 * | 8/2020 | Pawlowski | ............ B62D 33/06 |
| 2008/0006461 A1 | 1/2008 | Naganuma | |

(Continued)

FOREIGN PATENT DOCUMENTS

| | | |
|---|---|---|
| CN | 101830183 A | 9/2010 |
| CN | 102437355 A | 5/2012 |

(Continued)

OTHER PUBLICATIONS

Pohl, Hans, "Real-World Applications of Fuel Cells in Heavy Vehicles," May 2019, Research Institutes of Sweden, RISE Viktoria, 34 pages.

(Continued)

*Primary Examiner* — Paul N Dickson
*Assistant Examiner* — Matthew D Lee
(74) *Attorney, Agent, or Firm* — Withrow & Terranova, PLLC

(57) ABSTRACT

There is provided a truck, comprising a cab and a plurality of storage tanks secured behind the rear of the cab, wherein the storage tanks are configured to contain hydrogen gas. An energy conversion system is configured to receive hydrogen gas from the storage tanks and to convert the chemical energy of the hydrogen into mechanical or electric energy. A cooling arrangement is configured to cool the energy conversion system. A wall is provided behind the cab and laterally of the storage tanks, the wall having its main extension in a vertical plane, wherein said wall houses at least a part of said cooling arrangement.

11 Claims, 3 Drawing Sheets

(51) Int. Cl.
*B62D 35/00* (2006.01)
*B60K 15/03* (2006.01)
*B60K 15/063* (2006.01)

(52) U.S. Cl.
CPC ............... *B60K 2015/03118* (2013.01); *B60K 2015/03315* (2013.01); *B60K 2015/0638* (2013.01)

(58) Field of Classification Search
CPC ... B60K 15/067; B60L 50/71; B60L 2200/36; B60L 50/70; B60L 50/72; B62D 35/001; B62D 21/17; B60Y 2400/102
See application file for complete search history.

(56) References Cited

U.S. PATENT DOCUMENTS

| | | | |
|---|---|---|---|
| 2010/0193045 A1 | 8/2010 | Xu | |
| 2011/0288738 A1 | 11/2011 | Donnelly et al. | |
| 2014/0069972 A1* | 3/2014 | Willemsen | B60R 9/06 224/401 |
| 2014/0137953 A1 | 5/2014 | Gibb et al. | |
| 2016/0194037 A1 | 7/2016 | Logounov | |
| 2017/0282710 A1 | 10/2017 | Sloan et al. | |
| 2018/0339594 A1* | 11/2018 | Brown | B60W 20/15 |
| 2021/0129688 A1* | 5/2021 | Sawada | B62D 33/067 |
| 2021/0135255 A1* | 5/2021 | Sawada | H01M 8/04708 |
| 2021/0221223 A1* | 7/2021 | Sawada | B60K 15/063 |
| 2021/0362589 A1* | 11/2021 | Morinaga | B60K 15/03006 |
| 2022/0396143 A1* | 12/2022 | Zhang | B60K 15/07 |
| 2023/0234453 A1* | 7/2023 | Yamamoto | F17C 5/00 429/428 |

FOREIGN PATENT DOCUMENTS

| | | | | |
|---|---|---|---|---|
| CN | 203611740 U | | 5/2014 | |
| CN | 106129298 A | | 11/2016 | |
| CN | 112599816 A | * | 4/2021 | |
| CN | 115214389 A | * | 10/2022 | |
| EP | 3981628 A1 | * | 4/2022 | ............... B60K 1/00 |
| EP | 4026723 A1 | * | 7/2022 | |
| EP | 4119379 A1 | * | 1/2023 | ............. B60K 15/07 |
| WO | 2008156388 A1 | | 12/2008 | |
| WO | 2018217835 A1 | | 11/2018 | |
| WO | WO-2021075970 A1 | * | 4/2021 | ............. B60K 15/07 |
| WO | WO-2021101374 A1 | * | 5/2021 | ............. B60K 15/03 |
| WO | WO-2022094483 A1 | * | 5/2022 | |
| WO | WO-2023016846 A1 | * | 2/2023 | |

OTHER PUBLICATIONS

International Search Report and Written Opinion for International Patent Application No. PCT/EP2019/079988, dated Jul. 13, 2020, 18 pages.
International Preliminary Report on Patentability for International Patent Application No. PCT/EP2019/079988, dated Feb. 9, 2022, 15 pages.

* cited by examiner

TRUCK WITH REAR WALLS FOR HYDROGEN STORAGE

This application is a 35 USC 371 national phase filing of International Application No. PCT/EP2019/079988, filed Nov. 1, 2019, the disclosure of which is incorporated herein by reference in its entirety.

TECHNICAL FIELD

The present invention relates to a truck.

BACKGROUND

The vehicle industry is striving to reduce $CO_2$ emissions. Various alternatives to diesel and gasoline have been developed for energizing the vehicles. One such alternative is the use of hydrogen gas. The chemical energy of the hydrogen may, for example, be converted into mechanical energy in an internal combustion engine or into electric energy in fuel cells, in order to propel the vehicle. The hydrogen gas is normally stored in storage tanks provided on the vehicle.

U.S. 2018/0339594 discloses a hydrogen-powered fuel cell truck with hydrogen gas tanks arranged behind the cab of the truck. A coolant circuit is provided for cooling the fuel cells. The coolant circuit comprises a heat exchanger arranged under the chassis. The available space underneath the chassis is rather limited, and therefore the available heat exchanger area is also rather limited. Fuel cells reject a lot of heat and should normally be cooled to around 80° C. or lower. With increasing cooling demands for newer generations of hydrogen fuel cells, larger heat exchanger areas would be desirable.

SUMMARY

An object of the invention is to mitigate the drawbacks of the prior art. This and other object which will become apparent in the following are accomplished by a truck as defined in the accompanying independent claim.

According to a first aspect of the invention, the object is achieved by a truck, comprising
- a cab having a front and a rear, and further having two opposite lateral sides interconnecting the front and the rear of the cab,
- a plurality of storage tanks secured behind the rear of the cab, wherein the storage tanks are configured to contain hydrogen gas,
- an energy conversion system configured to receive hydrogen gas from the storage tanks and to convert the chemical energy of the hydrogen into mechanical or electric energy,
- a cooling arrangement configured to cool the energy conversion system, and
- a wall provided behind the cab and laterally of the storage tanks, the wall having its main extension in a vertical plane, wherein said wall houses at least a part of said cooling arrangement.

The invention is based on the insight that by reducing the extension of the storage tanks in the lateral direction of the truck, i.e. by not allowing the storage tank to reach the at least one of the lateral sides of the truck (or to be aligned with at least one of the lateral sides of the cab) a volume behind the rear of the cab is made available for other purposes. In particular, the inventors have realized that such a freed volume, having a large vertical height behind the rear of the cab, may advantageously be used for cooling purposes. Thus, a wall comprising at least a part of a cooling arrangement, such as comprising a heat exchanger, may suitably be provided in the wall. Thus, such a wall enables the provision of a much larger heat exchanger area than in the prior art. Additional benefits, include that the heat exchanger is easier to keep clean and to avoid dirt from clogging any airflow passages extending therethrough. With cleaner air more efficient heat exchanger cores can be used.

It should be understood that in this application the directional term "vertical" is to be related to the vehicle as such, irrespectively if it stands on a flat ground surface or on an inclined surface such as on a hill side. Thus, the wheels will normally form part of the vertically lowest part of the truck. The longitudinal direction of the truck extends from the front of the truck to the rear of the truck. Thus, the front and the rear of the cab are separated from each other along the longitudinal direction. The two lateral sides of the cab are separated from each other in the lateral direction, which extends transversely to the longitudinal and vertical directions. Thus, in for example FIG. 1b, which will be discussed in more detail below, the wall 50 may have a length L extending in the vertical direction of the truck, and a width W extending in the longitudinal direction of the truck. The wall 50 also may also have a thickness (perpendicular to the plane of the drawing) which extends in the lateral direction.

As will be discussed in connection with some exemplary embodiments, the truck may be provided with two substantially similar walls with parts of the cooling arrangement of different cooling arrangements. In such case, the two walls are suitably separated in the lateral direction and located on either side of the storage tanks. However, it is also conceivable to have only one such wall.

According to at least one exemplary embodiment, said wall has a length, a width and a thickness, wherein the length is greater than the width, and the width is greater than the thickness, wherein the length of the wall extends in the vertical direction of the truck, and the width of the wall extends in the longitudinal direction of the truck. Since there is no upper physical obstacle on the truck, the vertical extension of the wall may be made quite long, and the available space in the longitudinal direction (the space between the cab and for instance a trailer connected to the truck) is also quite large. Considering the fact that a heat exchanger have a rather small thickness, the wall may house a heat exchanger with quite a large heat exchanger area, thereby providing large cooling capacity to the energy conversion system, be it an internal combustion engine or fuel cells.

According to at least one exemplary embodiment, said wall has an inboard side facing the storage tanks, and an oppositely facing outboard side, wherein the outboard side substantially forms a continuation of one of the lateral sides of the cab. This is advantageous from an aerodynamic point of view, since it reduces the pressure drag which normally is present due to the large surface of the cab facing the main flow direction and the large wake resulting from the bluntness of the rear of the cab. This is further reflected in at least one exemplary embodiment, according to which said wall forms part of the aerodynamic kit of the truck.

According to at least one exemplary embodiment said wall is mounted directly or indirectly on the chassis of the truck, such as mounted to a rack for holding the storage tanks, which rack is attached to the chassis. Thus, the cooling arrangement containing wall may extend vertically upwards from the chassis. By connecting this wall to the chassis (directly or indirectly), the cab, if tiltable, may be tilted without disconnecting the wall. Suitably, the wall is placed at/near the lateral end/edge of the chassis. If two cooling arrangement containing walls are provided, then they may be placed at a respective opposite lateral end/edge of the chassis. A rack for holding the storage tanks may be attached to the chassis and may have an extension in the lateral direction of the truck, so that the outboard sides of cooling arrangement containing walls mounted to the rack are substantially aligned with the lateral ends/edges of the chassis.

According to at least one exemplary embodiment, the thickness of the wall is in the range of 50-300 mm, such as in the range of 60-200 mm, for example in the range of 80-120 mm. This is advantageous, since future safety regulations may potentially stipulate that hydrogen tanks should not extend all the way to the lateral sides of the truck, but for example be positioned at least 200 mm from the lateral sides of truck. It may be conceivable that, in some exemplary embodiments, some components protrude out from the wall on the inboard side. For instance, one or more motors that power one or more fans of a heat exchanger may protrude out from the wall, and even a portion of such fans may in some exemplary embodiments protrude out from the wall.

According to at least one exemplary embodiment, said wall comprises one or more energy absorbing structures forming collision protection for the storage tanks. Suitably, the wall comprises or consists of more yielding material than the material of the storage tanks. Thus, in case of an accidental lateral collision, the collision energy will at least initially be absorbed by the wall, thereby providing increased protection of the storage tanks. Suitably, the wall may comprise a deformable material, wherein collision energy may at least partly be taken up by the deformation of the wall.

According to at least one exemplary embodiment, the truck is configured to tow a trailer, wherein said wall is configured to extend between the rear of the cab and a towed trailer. Thus, the wall may cover completely or at least partly the lateral opening that is normally available between the rear of the cab and the towed trailer. This is advantageous from an aerodynamic perspective. Suitably, there may be two such cooling arrangement containing walls, one on each lateral side of the storage tanks.

According to at least one exemplary embodiment, the energy conversion system comprises fuel cells configured to generate electricity. Although the general inventive principle could be used for cooling other energy converting systems, the modern fuel cells assemblies are particularly advantageous, since they may require high cooling capacity, which the present inventive concept can cater for by means of a cooling arrangement containing wall at the rear of the cab, enabling a large heat exchanger area to be contained therein.

According to at least one exemplary embodiment, the cooling arrangement comprises:
a heat exchanger housed within said wall, and
a cooling passage for circulating cooling liquid, wherein the cooling passage extends from the heat exchanger, exits said wall and passes along the fuel cells for cooling said fuel cells. The cooling passage suitably forms part of a cooling medium recirculation loop. The cooling medium may suitably be water. The heat exchanger may, for instance, be cooled by an air flow through the heat exchanger, e.g. promoted by one or more air-sucking or air-pushing fans. Heat exchangers may be made relatively flat, thus fitting in a thin wall at the lateral side of the storage tanks. In other words, although the lateral extension of the storage tanks is limited, as they will not extend all the way from one lateral side to the other, they may still have quite a large extension in the lateral direction of the truck. Since there is no physical limit vertically upwards, the wall and thus the heat exchanger may be made quite high, enabling a large heat exchanger area for providing a good cooling capacity. As can be understood, the wall is suitably in the form of a hollow structure provided with one or more openings or perforations for allowing air to enter into the hollow structure for cooling the heat exchanger by means of the fans.

As already mentioned, the truck may have two cooling arrangement containing walls, one on either side of the storage tanks. This is reflected in at least one exemplary embodiment, according to which said wall is a first wall, the truck further comprising a second wall provided behind the cab and laterally of the storage tanks, so that said first and second walls are located on a respective lateral side of the storage tank, wherein said second wall having its main extension in a vertical plane, wherein said second wall houses at least a part of said cooling arrangement or a different cooling arrangement. Thus, the first and second wall may comprise a respective heat exchanger, which may be connected to a common recirculation loop or may be connected to a respective recirculation loop. It should be understood, that in other exemplary embodiments, the truck may have one cooling arrangement containing wall at one lateral side of the chassis and another wall (for example for aerodynamic and/or crash-protecting purposes) at the opposite lateral side of the chassis.

Furthermore, it should be understood that the present inventive concept may be combined with other means for cooling the energy conversion system, for instance additional cooling arrangements, such as one or more heat exchangers provided under the cab.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1A:
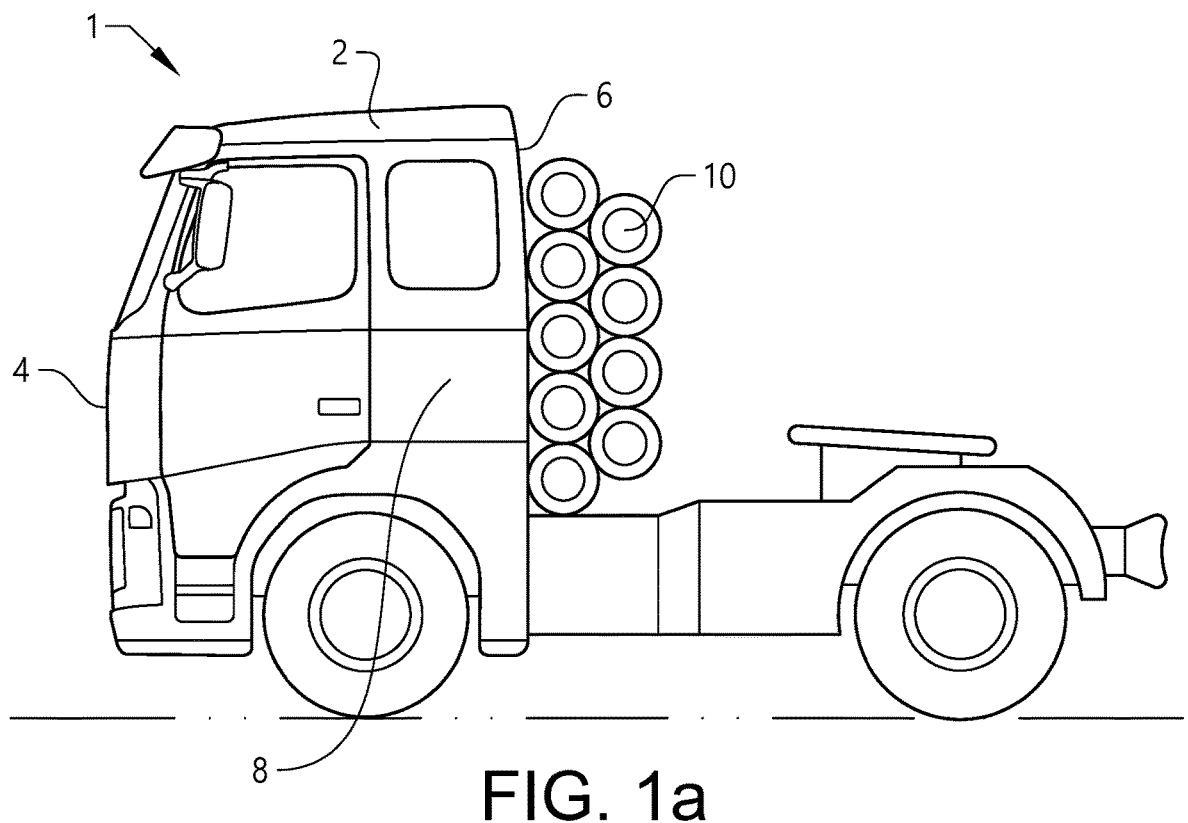
FIG. 1*a* illustrates a truck having storage tanks behind the cab.

FIG. 1*a* illustrates a truck 1 which comprises a cab 2 in which a driver may operate the truck 1. The cab 2 has a front 4 and a rear 6, and two opposite lateral sides 8 interconnecting the front 4 and the rear 6 of the cab 2. A plurality of storage tanks 10 are secured behind the rear 6 of the cab 2, wherein the storage tanks 10 are configured to contain hydrogen gas. The truck 2 comprises an energy conversion system (not shown) configured to receive hydrogen gas from the storage tanks 10 and to convert the chemical energy of the hydrogen into mechanical or electric energy.

Figure 1B:
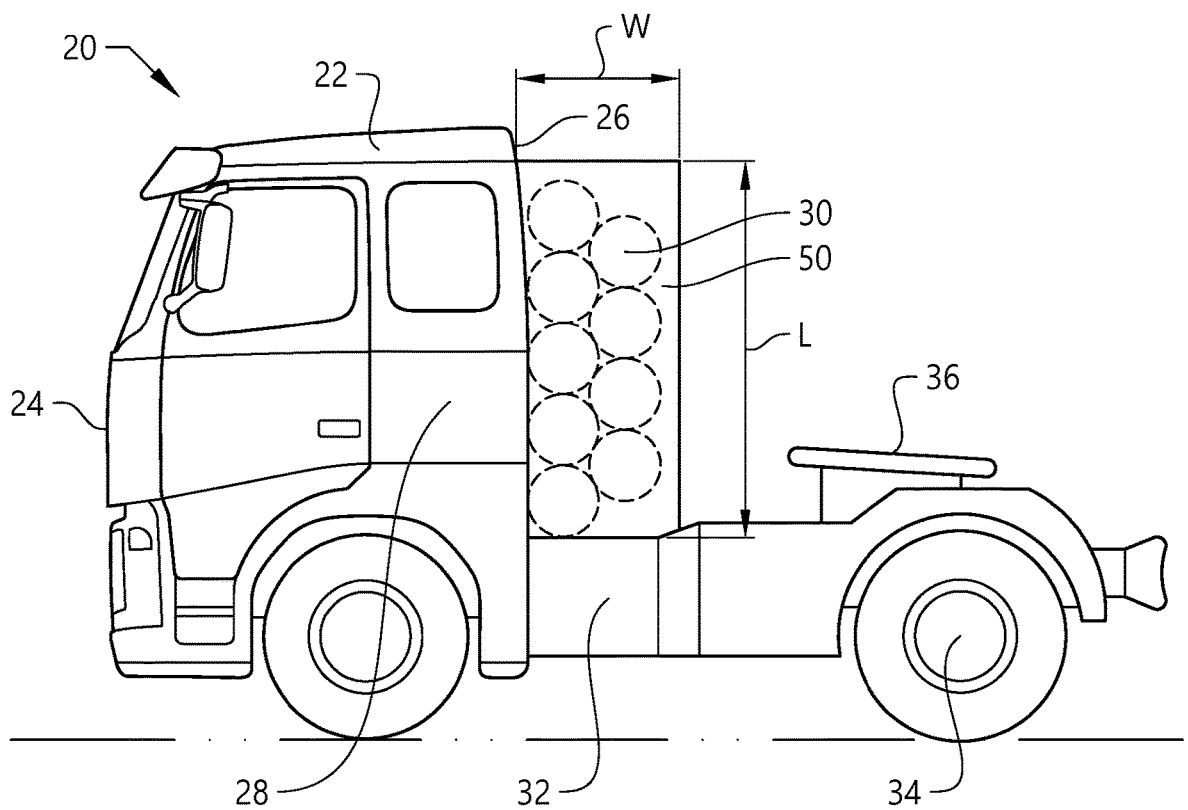
FIG. 1*b* illustrates a truck in accordance with at least one exemplary embodiment of the invention, having a wall provided behind the cab and laterally of the storage tanks, the wall having its main extension in a vertical plane, wherein said wall houses at least a part of a cooling arrangement.

FIG. 1b illustrates a truck 20 in accordance with at least one exemplary embodiment of the invention. Similarly to the truck 1 in FIG. 1a, the truck 20 in FIG. 1b has a cab 22, with a front 24, a rear 26 and two opposite lateral sides 28. A plurality of storage tanks 30 are provided behind the rear 26 of the cab 22. Suitably the storage tanks 30 may be held by a rack (not shown) attached to the chassis 32 of the truck 20. The storage tanks 30 are configured to contain hydrogen gas. The truck 20 comprises an energy conversion system (not shown) configured to receive hydrogen gas from the storage tanks 30 and to convert the chemical energy of the hydrogen into mechanical or electric energy. The truck 20 comprises a number of road wheels 34, herein illustrated as two pairs of wheels, however, in other embodiments there may be a different number of wheels, such as three pairs, four pairs or more.

The truck 20 in FIG. 1b further comprises a cooling arrangement (not shown in FIG. 1b) configured to cool the energy conversion system. A wall 50 is provided behind the cab 22 and laterally of the storage tanks 30. The wall 50 has its main extension in a vertical plane (i.e. the plane of the drawing). The wall 50 houses at least a part of said cooling arrangement. Although FIG. 1b is a side view, it should be understood that there may be a corresponding second wall on the other lateral side of the storage tanks 30, also behind the rear 26 of the cab 22. Such a second wall may house another part of the cooling arrangement or a part of a separate second cooling arrangement. In the following discussion, reference will only be made to the wall 50 shown in FIG. 1b. However, it should be understood that the features discussed in relation to this wall 50, may be equally applicable to the above mentioned second wall in embodiments having such a second wall.

The wall 50 has a length L, a width W, and a thickness T, wherein the length L is greater than the width W and the width W is greater than the thickness T. In other words, L>W>T. As illustrated in FIG. 1b, since there is no upper obstacle on the truck 20, the length L of the wall 50 may suitably extend in the vertical direction of the truck 20. The width W of the wall 50 may extend in the longitudinal direction of the truck 20. The thickness T (not shown) of the wall 50 may thus extend in the lateral direction of the truck, i.e. perpendicularly to the plane of the drawing.

The wall 50 has an inboard side facing the storage tanks 30, and an oppositely facing outboard side. Suitably, the outboard side may form a continuation of one of the lateral sides 28 of the cab. Thus, the outboard side of the wall 50 may suitably be aligned with the lateral side 28 of the cab 22 and form part of the aerodynamic kit of the truck 20. The wall is hollow, such that between the inboard side and the outboard side of the wall 50, there is a space for said part of the cooling arrangement.

The wall 50 may be directly or indirectly mounted on the chassis 32. For instance, there may be provided a rack for holding the storage tanks 30 and the rack may be attached to the chassis 34. The wall 50 may in such case suitably be mounted to the rack.

The thickness of the wall 50 may be in the range of 50-300 mm, such as in the range of 60-200 mm, for example in the range of 80-120 mm. For instance, from the inboard side to the outboard side, the wall 50 may span approximately 100 mm, leaving plenty of space in the lateral direction for the storage tanks 30. As mentioned above, the wall 50 may comprise a part of the cooling arrangement for cooling the energy conversion system. The large area available for the wall 50, and inside the wall, is particularly suitable for housing a heat exchanger. The core of a heat exchanger may be very thin, such as 30-100 mm, which may be held by a thicker frame. Fans may also fit inside the thin wall 50. Thus, the thin wall 50 combined with the large available heat exchanger area, is beneficial for creating an efficient cooling of the energy conversion device, without any substantial compromising on the size of the storage tanks 30. It may be conceivable that, in some exemplary embodiments, some components protrude out from the wall 50 on the inboard side. For instance, one or more motors that power one or more fans of a heat exchanger may protrude out from the wall 50, and even a portion of such fans may in some exemplary embodiments protrude out from the wall 50.

The wall 50 may suitably comprise one or more energy absorbing structures forming collision protection for the storage tanks 30. For instance, the hollow wall 50 may comprise deformable material which absorbs at least a part of the energy at an impact, so that a reduced amount, or none, of the impact energy reaches the storage tanks 30. Accordingly, the hollow, cooling arrangement containing wall 50 has multiple benefits. In addition to providing a large accessible area for efficient cooling, it may also improve the aerodynamic characteristics of the truck 20 as well as providing collision protection.

The truck 20 comprises a connector 36 for connecting and towing a trailer. The wall 50 may thus be configured to extend between the rear 26 of the cab 22 and a towed trailer. Suitably, the cab 22, the wall 50 and the towed trailer may form a substantially continuous contour, with only minor gaps in between, improving the aerodynamic characteristics of the complete combined vehicle.

The energy conversion system may suitably comprise fuel cells configured to generate electricity. However, it should be understood that the general inventive concept, including the wall 50 that houses part of the cooling arrangement, may be used for cooling other energy conversion systems as well. In the exemplary embodiment of the energy system comprising fuel cells, the hydrogen gas contained in the storage tanks 30 are supplied to the fuel cells for converting the chemical energy of the hydrogen to electric energy.

Figure 2:
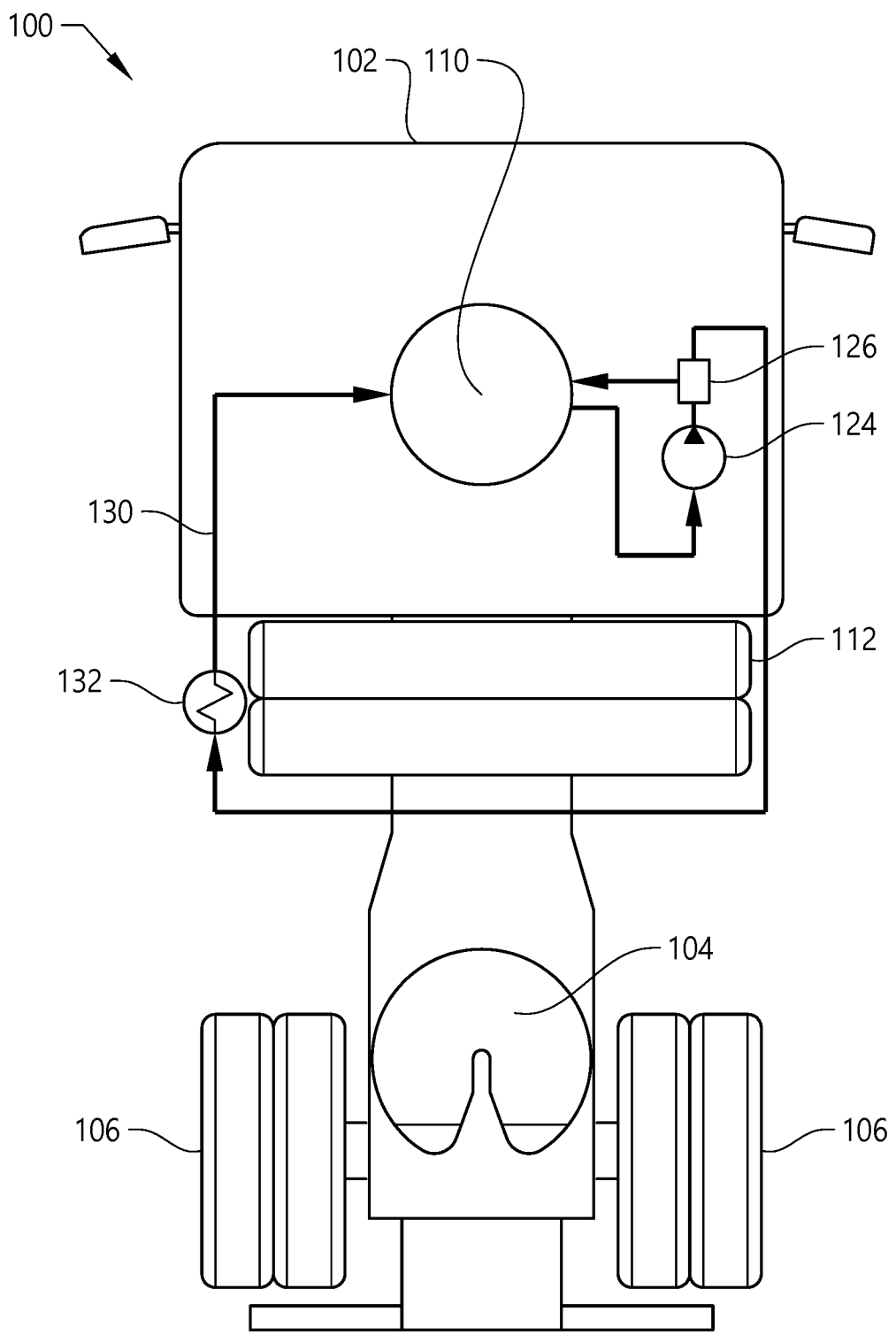
FIG. 2 illustrates schematically a cooling arrangement of the truck, in accordance with at according to at least one exemplary embodiment of the invention.

FIG. 2 illustrates schematically a cooling arrangement 100 of the truck, in accordance with at least one exemplary embodiment of the invention. The illustration is made relative to a schematic outline of certain parts of a truck, however, it should be understood that the specific location of the components may be placed differently than in the exemplary illustration. In the illustration a cab 102 of the truck, a connector 104 for towing a trailer and a pair of rear wheels 106 of the truck have been schematically indicated. At the cab 102, for example under the cab 102, there may be provided an energy conversion system, such as comprising a stack of fuel cells 110. Behind the cab 102, there are provided storage tanks 112 for containing hydrogen gas which may be supplied to the stack of fuel cells 110. Although not illustrated, the storage tanks 112 may suitably be held by a rack attached to the chassis, as previously mentioned.

The cooling arrangement 100 in FIG. 2 may comprise a heat exchanger 132 located within the hollow wall 50 illustrated in FIG. 1. The cooling arrangement 100 also comprises a cooling passage 130 for circulating cooling liquid. The cooling passage 130 extends from the heat exchanger 132, exits the wall (such as a wall 50 in FIG. 1), and passes along the stack of fuel cells 110 for transporting heat away from the stack of fuel cells 110.

A pump 124 is provided to pump water that has taken up heat from the stack of fuel cells 110. Downstream of the pump 124 there may be provided a thermostat 126 which senses the temperature of the water in the conduit and if the temperature is above a predefined value the water is led back to the heat exchanger 132 to be cooled down before returning to the stack of fuel cells 110. If the thermostat 126 determines that the temperature of the water is still low enough, it may be returned to the stack of fuel cells 110 without being led through the heat exchanger 132.

Figure 3:
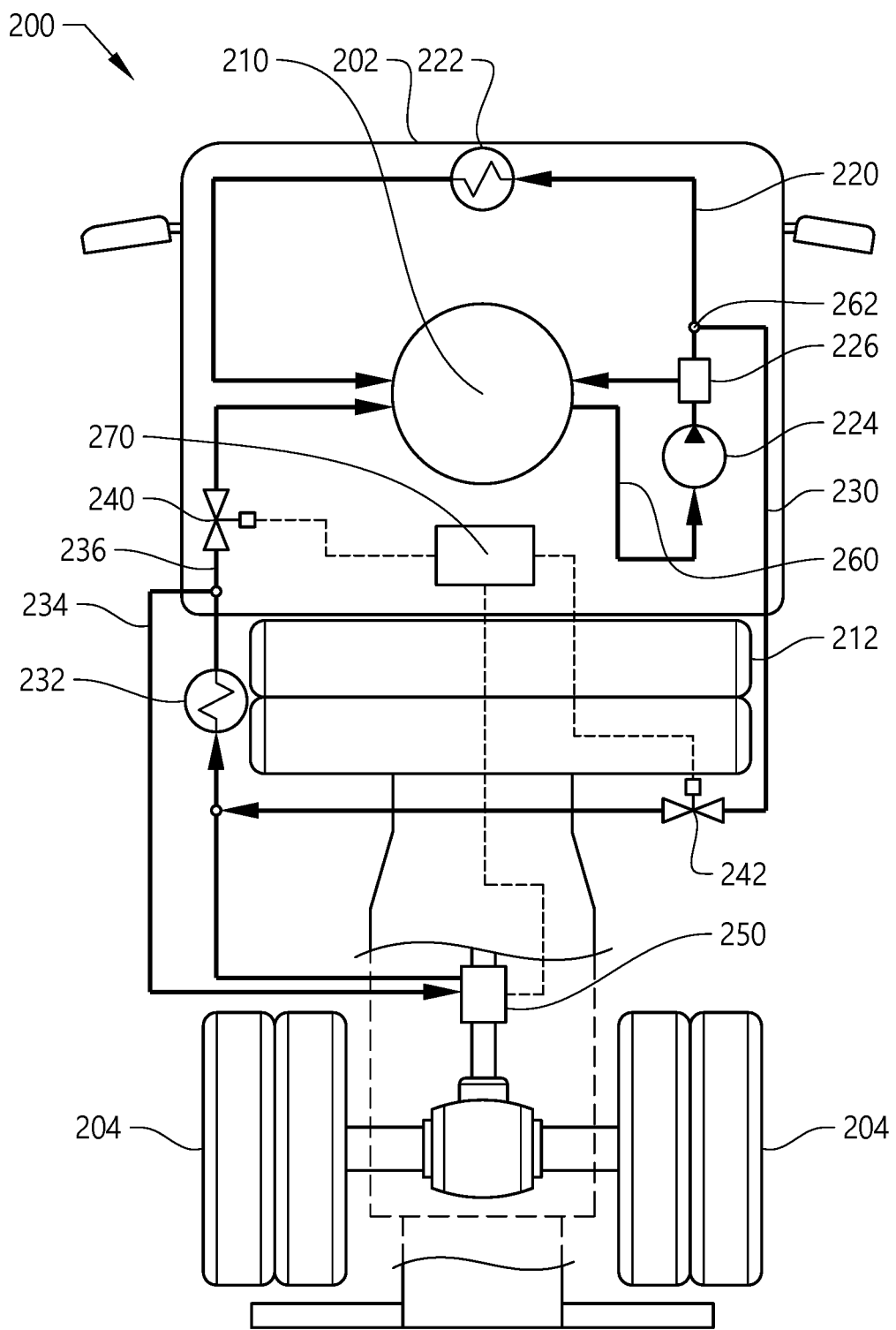
FIG. 3 illustrates schematically a cooling arrangement of the truck, in accordance with another exemplary embodiment of the invention.

FIG. 3 illustrates schematically a cooling arrangement 200 of the truck, in accordance with another exemplary embodiment of the invention. In this exemplary embodiment, there are provided two heat exchangers 222, 232. A first heat exchanger 222 may be arranged, for instance under the cab 202, and a second heat exchanger 232 may be arranged behind the rear of the cab 202 within the hollow wall 50 of FIG. 1, similarly to the heat exchanger 132 in FIG. 2. As will be explained, the second heat exchanger 232 may be used in connection with at least two different modes of operation.

The cooling arrangement 200 in FIG. 3 may actually be regarded as a combined cooling and water braking system in accordance with at least one exemplary embodiment of the invention. The illustrated exemplary embodiment of the cooling arrangement 200 comprises a first water recirculation loop 220. The first heat exchanger 222, which forms part of the first water recirculation loop 220, is configured to cool water flowing in the first water recirculation loop 220. The first water recirculation loop 220 comprises a water conduit for transporting heat away from the stack of fuel cells 210.

The illustrated exemplary embodiment of the cooling arrangement 200 also comprises a second water recirculation loop 230. The second water recirculation loop 230 has said second heat exchanger 232 configured to cool water flowing in the second water recirculation loop 230.

Before going into the details of the second water recirculation loop 230, it should be noticed that the illustrated exemplary embodiment of the cooling arrangement 200 also comprises a retarder 250. The retarder 250 is configured to be coupled the pair of rear wheels 204 of the truck. The retarder 250 is switchable between an inactive state and an active state. In the inactive state the retarder 250 does not affect the rotation speed of the wheels 204. In the active state the retarder 250 causes the rotational speed of the wheels 204 to be reduced.

Turning back to the details of the second water recirculation loop 230, it comprises a first water conduit portion 234 and a second water conduit portion 236. The first water conduit portion 234 connects the second heat exchanger 232 and the retarder 250 for enabling water braking when the retarder 250 is in its active state. The second water conduit portion 236 extends from the second heat exchanger 232 for transporting heat away from the stack of fuel cells 210. The second water conduit portion 236 may be closed, for instance by means of a first valve 240. The second water conduit portion 236 may suitably also be closed by means of a second valve 242. The first valve 240 is located downstream of the second heat exchanger 232 and upstream of the stack of fuel cells 210. The second valve 242 is located downstream of the stack of fuel cells 210 and upstream of the second heat exchanger 232.

The cooling arrangement 200 is switchable between a first mode of operation and a second mode of operation. In the first mode of operation the retarder 250 is in the inactive state and the second water conduit portion 236 of the second water recirculation loop 230 together with the water conduit of the first water recirculation loop 220 transport heat away from the stack of fuel cells 210. Thus, in the illustrated exemplary embodiment, the first and the second valves 240, 242 are open to allow the water to recirculate via the second heat exchanger 232 to the stack of fuel cells 210. As illustrated in FIG. 3, the first and the second water recirculation loops 220, 230 may have a common section 260 from the stack of fuel cells 210 to the thermostat 226 and then downstream of the thermostat 226 be divided into two separate sections at a branching point 262. However, in other exemplary embodiments, the first and the second water recirculation loops may exit as separate sections from the stack of fuel cells and two separate pumps and thermostats may be provided for the respective recirculation loop.

In the second mode of operation, the retarder 250 is in the active state and the water conduit of the first water recirculation loop 220 transports heat away from the stack of fuel cells 210, whereas the second water conduit portion 236 of the second water recirculation loop 230 is closed, preventing water to flow from the second heat exchanger 232 to the stack of fuel cells 210. Thus, in the second mode of operation the first valve 240 is closed. Suitably, in the illustrated exemplary embodiment, the second valve 242 is also closed, so as to avoid losing water from the first water recirculation loop 220 to the second water recirculation loop 230.

Suitably, the cooling arrangement 200 may comprise a control unit 270 configured to perform the switching between said first mode of operation and said second mode of operation. The control unit 270 may thus be operatively connected to the first valve 240, the second valve 242 and the retarder 250, in order to control the opening and closing of the first and second valves 240, 242, and the activating and inactivating of the retarder 250. In addition to controlling the just mentioned components, the control unit 270 may suitably be operatively connected to control and/or communicate with other components as well, such as for instance the pump 224 and/or the thermostat 226.

The control unit 270 may comprise or may be comprised in a processing circuitry. The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry may be at least partly integrated with the control unit 270.

Because the temporary water braking (i.e. the second mode of operation) causes a strong rise in temperature of the water in the first water conduit portion 234 of the second recirculation loop 230, it may be recommendable to postpone the opening of the second water conduit portion 236 of the second recirculation loop 230 until the temperature has fallen sufficiently to be able to once again be used for cooling the stack of fuel cells 210. Therefore, the cooling arrangement 200 may suitably be further operable in a third mode of operation, which is an intermediate mode of operation before switching back from the second mode of operation to the first mode of operation. In the third mode of operation, the retarder 250 is, or has been, switched from the active state (used in the second mode of operation) to the inactive state, and the second water conduit portion 236 of the second water recirculation loop 230 is maintained closed. Thus, the second heat exchanger 232 is allowed to cool down the high temperature water circulating in the first water conduit portion 234 before the second water conduit portion 236 is opened again (and thus before the first valve 240 and the second valve 242 is opened again in FIG. 3).

The control unit 270 may be configured to switch from the third mode of operation when the temperature of the water in the second water recirculation loop 230, in particular in the first water conduit portion 234, has fallen to or below a predetermined value. Suitably, a temperature sensor (not shown) may be provided in the first water conduit portion, and such a temperature sensor may suitably be operatively connected to the control unit 270.

In at least some exemplary embodiments, during said third mode of operation, the retarder 250 may operate in a pumping mode, without providing water braking. Thus, after water braking, in the inactive state (i.e. inactive with respect to affecting the rotational speed of the wheels) the retarder 250 may pump the heated water in said first water conduit portion 234 of the second water recirculation loop 230 so that the water is recirculated through the second heat exchanger 232 for cooling. When the recirculated water has cooled down sufficiently, the system 200 may once again operate in the first mode of operation, opening the closed second water conduit portion 236. In other exemplary embodiments, there may be provided a separate pump (not illustrated) in the first water conduit portion 234 of the second water recirculation loop 230 for pumping the water during the third mode of operation of the system. According to at least some exemplary embodiments, there may be provided a separate pump for providing water to the retarder 250 also in the second mode of operation of the system 200, i.e. when the retarder 250 is in its water braking active state. Thus, the retarder 250 itself does not necessarily need any pumping functionality at all, but may in exemplary embodiments rely upon a separate pump in the first water conduit portion 234 of the second water recirculation loop 230. The control unit 270 may suitably be operatively connected to control such a separate pump.

It is to be understood that the present invention is not limited to the embodiments described above and illustrated in the drawings; rather, the skilled person will recognize that many changes and modifications may be made within the scope of the appended claims.

The invention claimed is:

1. A truck, comprising a cab having a front and a rear, and further having two opposite lateral sides interconnecting the front and the rear of the cab, a plurality of storage tanks secured behind the rear of the cab, wherein the storage tanks are configured to contain hydrogen gas, an energy conversion system configured to receive hydrogen gas from the plurality of storage tanks and to convert chemical energy of the hydrogen gas into mechanical energy or electric energy, a cooling arrangement configured to cool the energy conversion system, and a wall provided behind the cab and laterally of the storage tanks, the wall having its main extension in a vertical plane, wherein the wall houses at least a part of the coiling arrangement, and wherein the wall is hollow, and the part of the cooling arrangement is between an inboard side and an outboard side of the wall.

2. The truck of claim 1:
   wherein the wall has a length, a width, and a thickness,
   wherein the length is greater than the width, and the width is greater than the thickness, and
   wherein the length of the wall extends in the vertical direction of the truck, and the width of the wall extends in the longitudinal direction of the truck.

3. The truck of claim 1:
   wherein the wall has an inboard side facing the plurality of storage tanks, and an oppositely facing outboard side, and
   wherein the outboard side substantially forms a continuation of one of the lateral sides of the cab.

4. The truck of claim 1, wherein the wall forms part of an aerodynamic kit of the truck.

5. The truck of claim 1, further comprising a chassis,
   wherein the wall is directly or indirectly mounted on the chassis, such as mounted to a rack for holding the plurality of storage tanks, and
   wherein the rack is attached to the chassis.

6. The truck of claim 1, wherein the thickness of the wall is in the range of 50-300 mm.

7. The truck, of claim 1 wherein the wall comprises one or more energy absorbing structures forming collision protection for the plurality of storage tanks.

8. The truck of claim 1:
   wherein the truck is configured to tow a trailer, and
   wherein the wall is configured to extend between the rear of the cab and a towed trailer.

9. The truck of claim 1, wherein the energy conversion system comprises fuel cells configured to generate electricity.

10. The truck of claim 9, wherein the cooling arrangement comprises:
    a heat exchanger housed within the wall, and
    a cooling passage for circulating cooling liquid, wherein the cooling passage extends from the heat exchanger, exits the wall and passes along the fuel cells for cooling the fuel cells.

11. The truck of claim 1:
    wherein the wall is a first wall, the truck further comprising a second wall provided behind the cab and laterally of the storage tanks, so that the first and the second walls are located on a respective lateral side of the storage tank,
    wherein the second wall has its main extension in a vertical plane, and
    wherein the second wall houses at least a part of the cooling arrangement or a different cooling arrangement.

\* \* \* \* \*